United States Patent
Quinn et al.

(10) Patent No.: US 10,384,270 B1
(45) Date of Patent: Aug. 20, 2019

(54) CUTTING TOOL

(71) Applicant: Honda Motor Co., Ltd., Tokyo (JP)

(72) Inventors: Dale Quinn, Creemore (CA); Joseph Zarb, King City (CA); Adam Bezzina, Barrie (CA)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/915,481

(22) Filed: Mar. 8, 2018

(51) Int. Cl.
*B23B 27/00* (2006.01)
*B23B 27/16* (2006.01)
*B23B 29/12* (2006.01)

(52) U.S. Cl.
CPC .......... *B23B 27/1625* (2013.01); *B23B 29/12* (2013.01); *B23B 2205/04* (2013.01); *B23B 2270/16* (2013.01)

(58) Field of Classification Search
CPC .... B23F 21/128; B23F 21/223; B23F 21/226; B23F 21/236; Y10T 407/171
See application file for complete search history.

(56) References Cited

U.S. PATENT DOCUMENTS

| | | | |
|---|---|---|---|
| 3,861,010 | A | 1/1975 | Weinreich |
| 4,367,991 | A | 1/1983 | Grafe et al. |
| 4,645,384 | A | 2/1987 | Shimomura et al. |
| 6,220,795 | B1 | 4/2001 | Matthews |
| 6,609,858 | B1 * | 8/2003 | Francis ................. B23F 21/226 407/113 |
| 8,734,064 | B2 | 5/2014 | Koontz |
| 8,764,352 | B2 | 7/2014 | Nomura |
| 2007/0065240 | A1 * | 3/2007 | Berger ................... B23B 27/04 407/117 |
| 2007/0140798 | A1 * | 6/2007 | Cole ..................... B23C 5/2221 407/21 |
| 2010/0150672 | A1 * | 6/2010 | Edler .................... B23B 27/00 407/120 |
| 2010/0196107 | A1 * | 8/2010 | Ribbeck ................. B23C 3/28 407/22 |
| 2012/0282048 | A1 | 11/2012 | Kountanya | |
| 2012/0282054 | A1 | 11/2012 | Jager et al. | |

(Continued)

OTHER PUBLICATIONS

"5pcs/set ¼"*2" Wear Resistant Turning Boring tools C6 Chipbreaker Carbide Indexable Turining Insert Lathe Tool Bit Set Mayitr" https://www.aliexpress.com/item/5pcs-set-1-4-2-Wear-Resistant-Turning-Boring-Tools-C6-Chipbreaker-Carbide-Indexable-Turning-Insert/32816426241.html.

*Primary Examiner* — Willmon Fridie, Jr.
(74) *Attorney, Agent, or Firm* — Honda Patents & Technologies North America, LLC; Mark E. Duell (57) ABSTRACT

A machining tool for cutting a work component includes a cutting tool insert having a cutting surface along a portion of an external surface that defines a circumference of the cutting tool insert. A plurality of cartridges are insertable into the machining tool, each having an insert pocket for receiving the cutting tool insert. The cutting tool insert is rotatable between first, second and third fixed positions in each insert pocket of the plurality of cartridges, a first portion of the cutting surface exposed when the cutting tool insert is in the first fixed position, a second portion of the cutting surface exposed when the cutting tool insert is in the second fixed position, and a third portion of the cutting surface exposed when the cutting tool insert is in the third fixed position. The insert pocket of each of the plurality of cartridges is offset from each other.

20 Claims, 10 Drawing Sheets

(56) References Cited

U.S. PATENT DOCUMENTS

2013/0202375 A1    8/2013  Ramesh
2014/0056657 A1*   2/2014  Jia .................... B23F 21/226
                                                              407/22
2015/0132075 A1*   5/2015  Sjoo ................... B23F 21/223
                                                              407/21

* cited by examiner

CUTTING TOOL

TECHNICAL FIELD

The embodiments described herein relate to the field of machining tools capable of cutting a work component.

BACKGROUND

Cutting tools with cutting tool inserts that include cutting surfaces with high degrees of hardness are used in finebore machining processes. The high hardness cutting surfaces of the inserts may become dulled after as few as two uses, at which point they may be spent or used in a roughbore machining process. The materials required for these finebore machining processes, such as artificial diamond or cubic boron nitride, can be costly to produce. Therefore, there is a need for a system that extends the life of the cutting tool inserts to maximize the usage of a single cutting tool insert in a finebore, or high precision, machining process.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a machining tool for cutting a work component includes a cutting tool body, a cutting tool insert comprising a cutting tool insert body having a cutting surface along a portion of an external surface that defines a circumference of the cutting tool insert, a first cartridge insertable into and removable from the cutting tool body, the first cartridge having a first insert pocket defined therein and configured to receive the cutting tool insert, the cutting tool insert rotatable between at least first and second fixed positions in the first insert pocket, a first portion of the cutting surface exposed when the cutting tool insert is in the first fixed position, and a second portion of the cutting surface exposed when the cutting tool insert is in the second fixed position, and a second cartridge insertable into the cutting tool body when the first cartridge is removed and removable from the cutting tool body, the second cartridge having a second insert pocket defined therein and configured to receive the cutting tool insert, the second insert pocket being offset compared to the first insert pocket of the first cartridge, the cutting tool insert rotatable between at least first and second fixed positions in the second insert pocket, a third portion of the cutting surface exposed when the cutting tool insert is in the first fixed position of the second insert pocket, and a fourth portion of the cutting surface exposed when the cutting tool insert is in the second fixed position of the second insert pocket.

According to another aspect, a machining tool for cutting a work component includes a cutting tool body, a cutting tool insert comprising a cutting tool insert body having a cutting surface along a portion of an external surface that defines a circumference of the cutting tool insert, a plurality of cartridges insertable into and removable from the cutting tool body, each of the plurality of cartridges having an insert pocket defined therein and configured to receive the cutting tool insert, the cutting tool insert rotatable between first, second and third fixed positions in each insert pocket of the plurality of cartridges, a first portion of the cutting surface exposed when the cutting tool insert is in the first fixed position, a second portion of the cutting surface exposed when the cutting tool insert is in the second fixed position, and a third portion of the cutting surface exposed when the cutting tool insert is in the third fixed position, the insert pocket of each of the plurality of cartridges being offset from each other.

According to yet another aspect, a method of cutting a work component with a machining tool includes the steps of inserting a cutting tool insert having a cutting surface that defines a circumference around the cutting tool insert into a first fixed position in an insert pocket formed in one of a plurality of cartridges, inserting the one of a plurality of cartridges into a body of the machining tool, cutting the work component, rotating the cutting tool insert to a second fixed position in the insert pocket, cutting the work component, rotating the cutting tool insert to a third fixed position in the insert pocket, cutting the work component, removing the one of a plurality of cartridges from the body of the machining tool, removing the cutting tool insert from the one of a plurality of cartridges, and inserting the cutting tool insert into another one of the plurality of cartridges in which the insert pocket is offset form the insert pocket of the one of plurality of cartridges.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
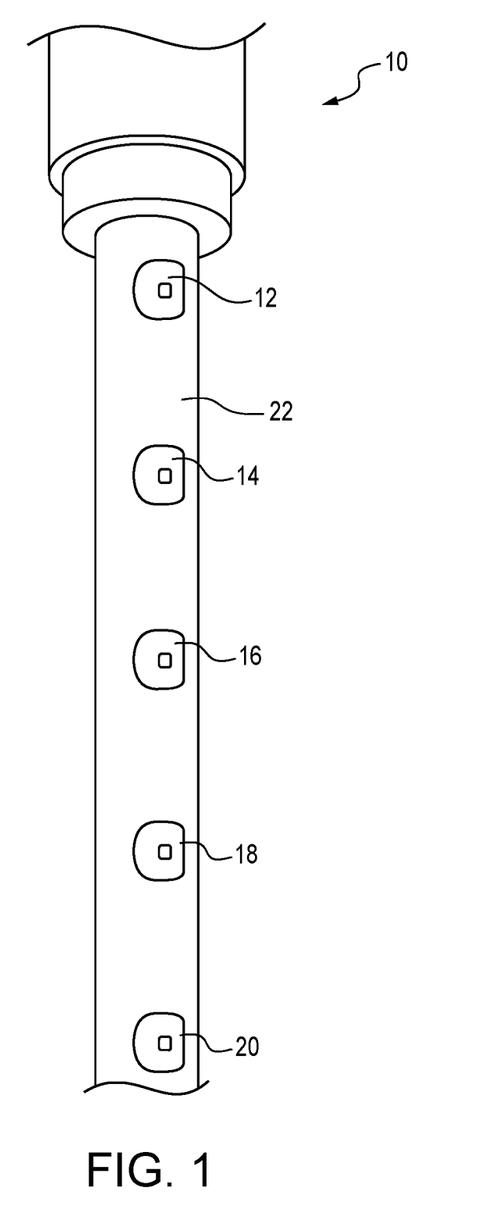
FIG. 1 is side view of a machining tool for cutting a work component.

FIG. 1 is a view of a machining tool 10 used to cut a work component. The description below will reference one part of the machining tool 10, but it should be understood that the embodiments described herein may be applied in bulk terms as illustrated in FIG. 1.

Figure 2:
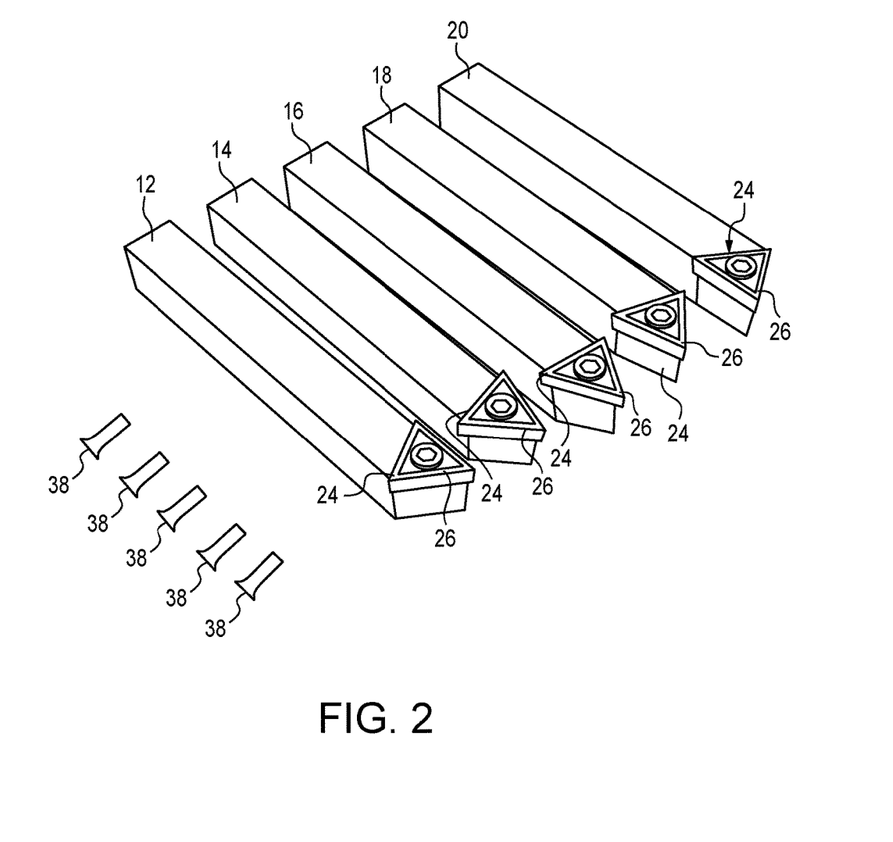
FIG. 2 is an embodiment of a plurality of cartridges and cutting tool inserts for use with the machining tool of FIG. 1 for cutting a work component.
Figure 3:
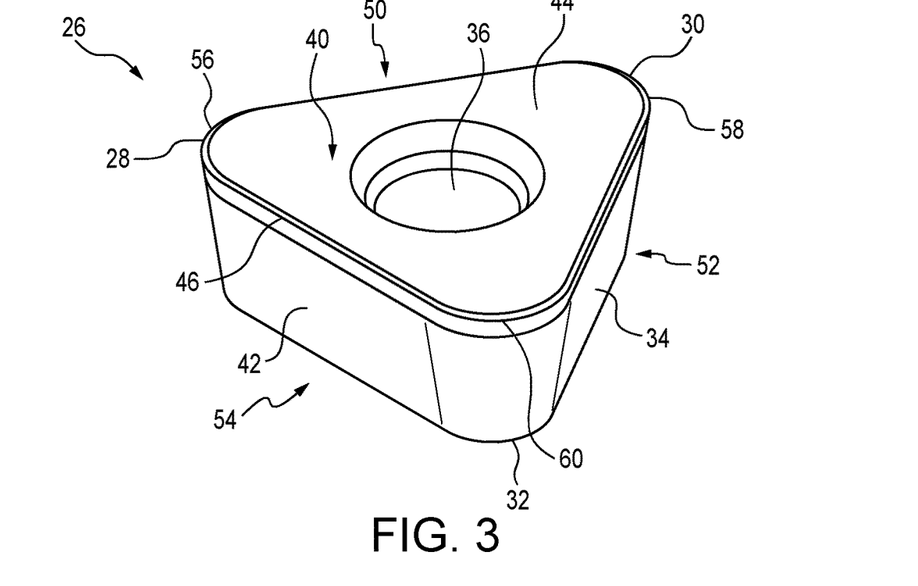
FIG. 3 is a perspective view of an embodiment of a cutting tool insert for use in the machining tool of FIG. 1.

FIG. 2 is perspective view of a plurality of cartridges 12, 14, 16, 18, 20 for use with the machining tool 10 illustrated in FIG. 1. Each of the cartridges 12, 14, 16, 18, 20 is designed to be inserted into the cutting tool body 22 of the machining tool 10. Each of the cartridges 12, 14, 16, 18, 20 includes an insert pocket 24 for receiving a cutting tool insert 26. Although illustrated as including five cartridges 12, 14, 16, 18, 20, machining tool 10 may include any number of cartridges that allows the machining tool 10 to function as described herein.

FIGS. 3-7 are views of the cutting tool insert 26. The cutting tool insert 26 is a generally in the shape of a triangular prism with rounded vertices 28, 30, 32. Although illustrated as including three rounded vertices 28, 30, 32, cutting tool insert 26 may include any number of vertices that allow the machining tool 10 to function as described herein. The body 34 of the cutting tool insert 26 may be constructed of tungsten carbide, or any other suitably hard material. The body 34 further includes a center bore 36 for receiving a fastener 38 (shown in FIG. 2), such as an insert screw, for securing the cutting tool insert 26 to each of the cartridges 12, 14, 16, 18, 20.

Figure 6:
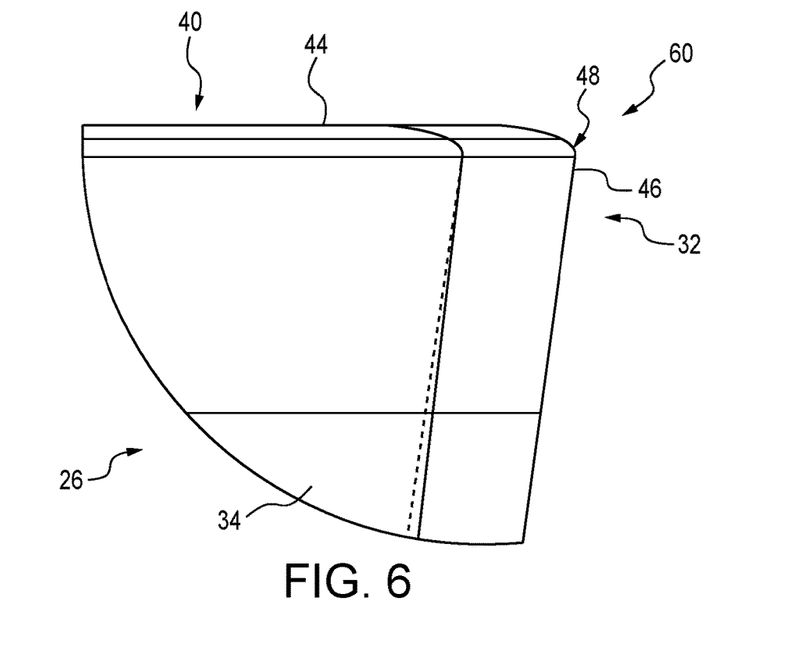
FIG. 6 is a close-up of a portion of FIG. 5, designated portion A in FIG. 5.

A top face 40 and a portion of an external surface 42 along the sides of the body 34 of the cutting tool insert 26 are coated with a cubic boron nitride layer 44, or any other suitably hard coating. The portion of the cubic boron nitride layer 44 along the external surface 42 along the sides of the body 34 defines the cutting surface 46 of the cutting tool insert 26. As illustrated in FIG. 6, the cutting surface 46 may include a chamfered edge 48 to aid in cutting.

Figure 4:
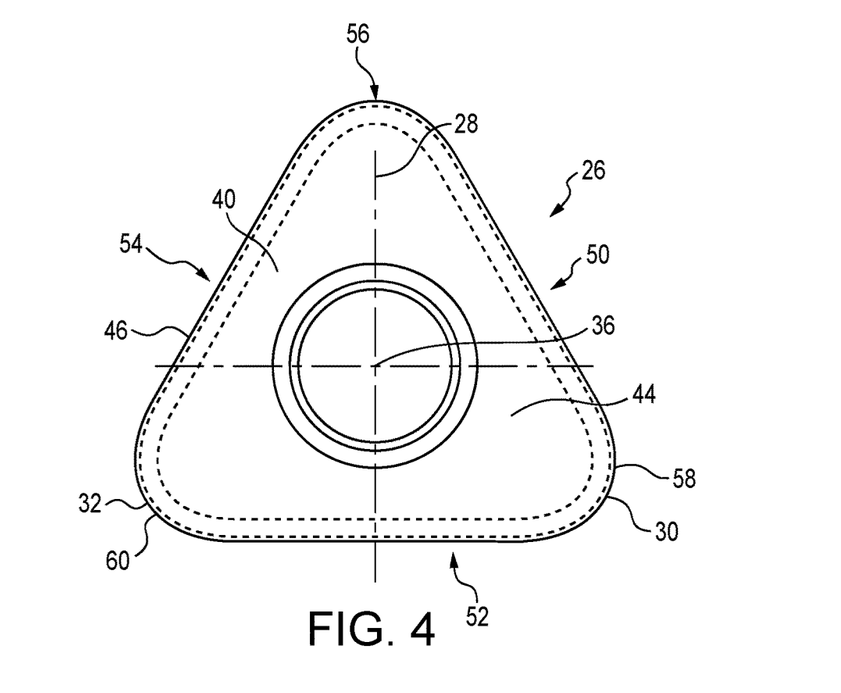
FIG. 4 is a top view of the cutting tool insert of FIG. 3.
Figure 5:
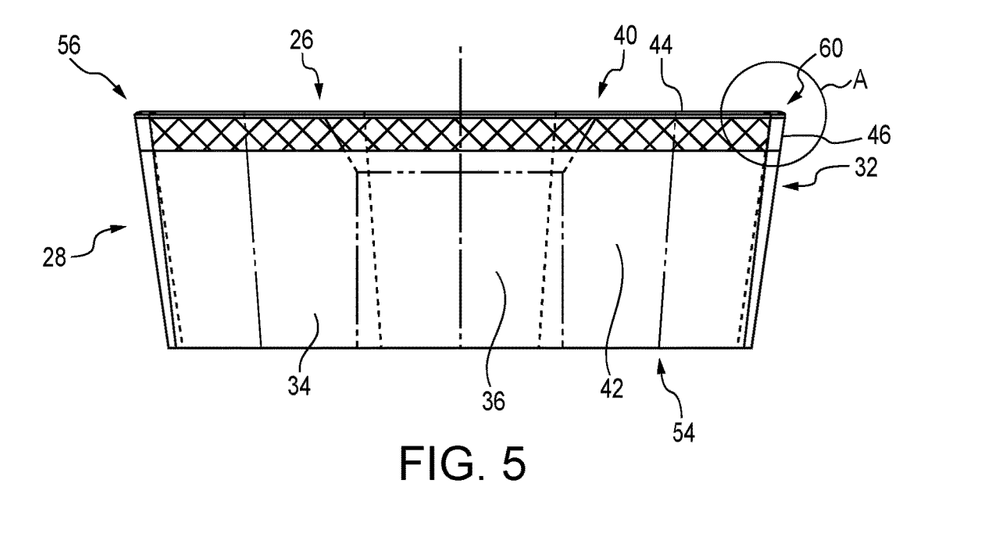
FIG. 5 is a side view of the cutting tool insert of FIG. 3.
Figure 7:
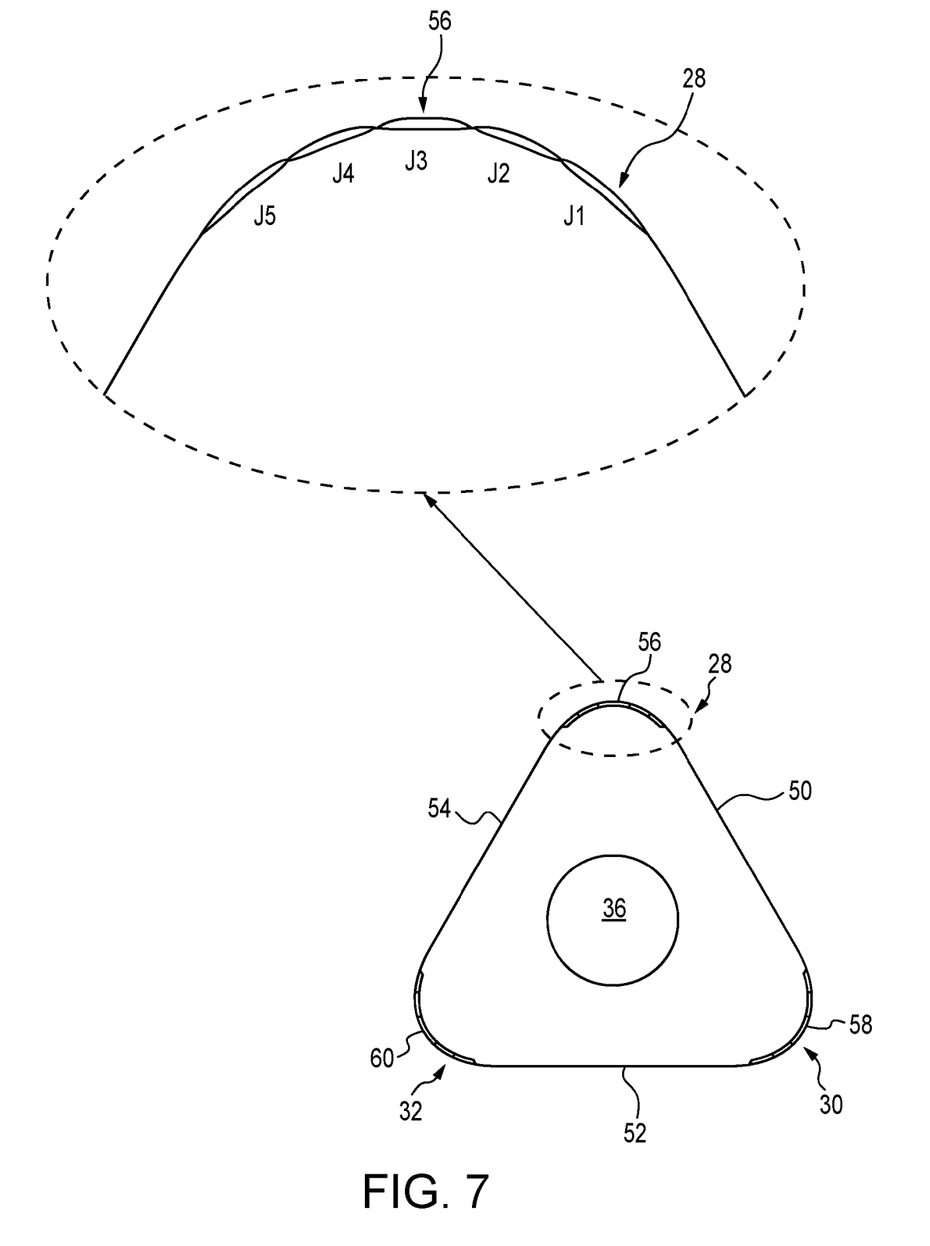
FIG. 7 is a schematic of a top view of the cutting tool insert of FIG. 3 with a close-up of a representative vertex illustrating regions $J_1$-$J_5$ of the vertex's primary effective cutting surface.

Because the cutting tool insert 26 has a generally triangular shape when viewed from a top view, as viewed in FIGS. 4 and 7, with three sides 50, 52, 54 of the external surface 42 and three rounded vertices 28, 30, 32, the cutting tool insert 26 may have three primary effective cutting surfaces 56, 58, 60 located at the rounded vertices of the cutting tool insert 26, which are exposed when the cutting tool insert 26 is inserted into the insert pocket 24 and secured with the fastener 38 seated in the bore 36. After the first primary effective cutting surface 56 of the first vertex 28 is used in the machining tool 10, the cutting tool insert 26 may be removed and rotated so the second primary effective cutting surface 58 of the second vertex 30 is used in the machining tool 10. Finally, after the second primary effective cutting surface 58 of the second vertex 30 is used, the cutting tool insert 26 may be removed and rotated so the third primary effective cutting surface 60 of the third vertex 32 is used in the machining tool 20. The external surface 42 along the sides of the body 34 provide sidewalls of the cutting tool insert 26 that engage with the walls of the insert pocket 24 that, in conjunction with the fastener 38, securely hold the cutting tool insert 26 in place during use. The vertices 28, 30, 32, which are exposed one at a time, provide the primary effective cutting surfaces 56, 58, 60 used in the machining process.

In addition to the cubic boron nitride layer 44 that defines the cutting surface 46 on the the external surface 42, the cutting tool insert 26 may also be coated with a titanium nitride, or tinite, coating. The titanium nitride coating may be used to further harden and extend the cutting life of the cutting surface 46 specifically and the cutting tool insert 26 in general. Any other suitable coating known to those skilled in the art may also be applied.

FIGS. 8-17 illustrate an embodiment showing five separate cartridges 12, 14, 16, 18, 20, each used with a single cutting tool insert 26. In each of the five cartridges 12, 14, 16, 18, 20, as illustrated in each of the FIGS. 8-17 the insert pocket 24 in any of the cartridges 12, 14, 16, 18, 20 is offset from the insert pocket 24 of each of the other cartridges 12, 14, 16, 18, 20. The offset insert pockets 24 for each of the five cartridges 12, 14, 16, 18, 20 permit a different portion $J_1$, $J_2$, $J_3$, $J_4$, $J_5$ of each of the rounded vertices 28, 30, 32 of the cutting tool insert 26, as illustrated in FIG. 7, to be the distal point of contact when the cutting tool insert 26 is inserted in each of the five cartridges 12, 14, 16, 18, 20.

Figure 8:
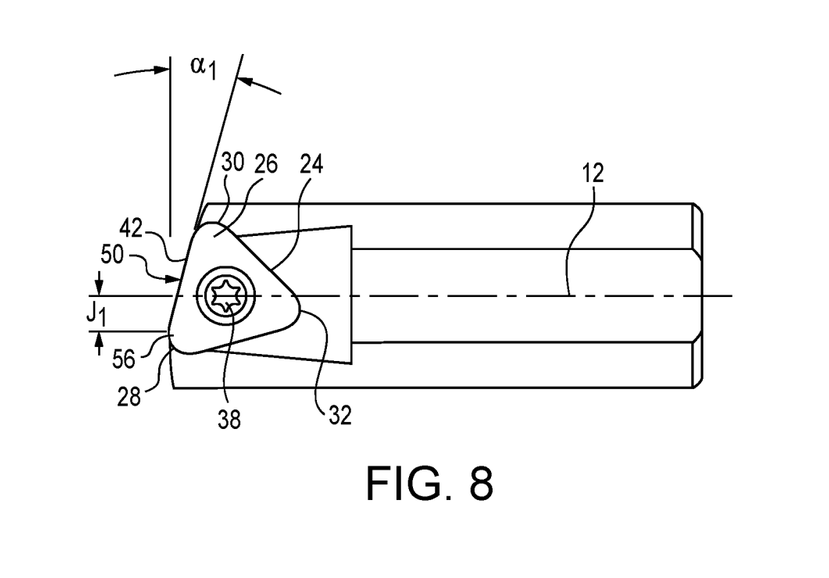
FIG. 8 is a top view of an embodiment of a first cartridge with the cutting tool insert installed for use with the machining tool of FIG. 1.
Figure 9:
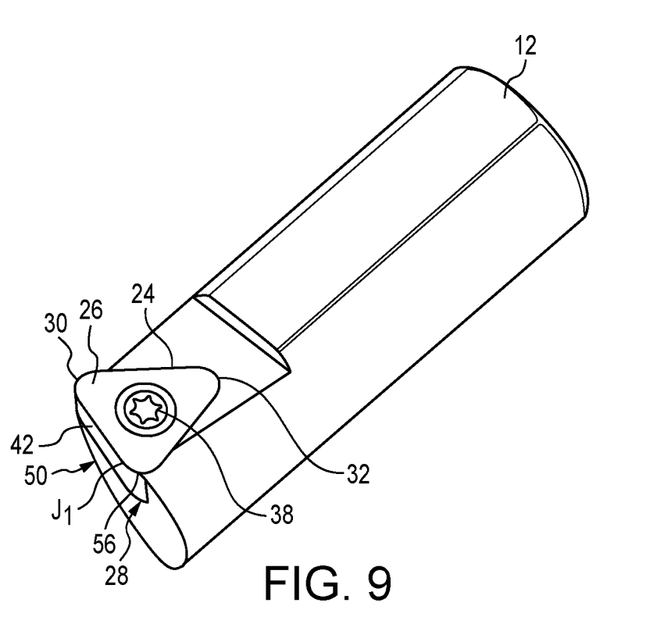
FIG. 9 is a perspective view of the first cartridge with the cutting tool insert of FIG. 8.

In the embodiment illustrated in FIGS. 8-9, the cutting tool insert 26 is positioned and secured using fastener 38 in the first cartridge 12, with the exposed side 50 of the external surface 42 angled at $\alpha_1$ from vertical, as shown in FIG. 8, exposing portion $J_1$ of the first vertex 28. In the illustrated embodiment angle $\alpha_1$ is approximately 15°, although in alternate embodiments α1 may range between 10° and 25°. The first cartridge 12 is positioned in the machining tool 10 as illustrated in FIG. 1, and the first effective cutting surface 56 may be utilized for additional operations, usually a specified number of operations, until it becomes too dull to perform additional operations. In the typical machining tool 10, the cutting tool insert 26 may be used for two cutting operations before requiring replacement. After completing the specified number of operations, the first cartridge 12 is removed, and the cutting tool insert 26 is removed and rotated to expose the portion $J_1$ of the second vertex 30. At this point, the first cartridge 12 is then returned to the machining tool 10 for the specified number of operations. The process is repeated a third time to expose the portion $J_1$ of the third vertex 32 for a specified number of operations.

Figure 10:
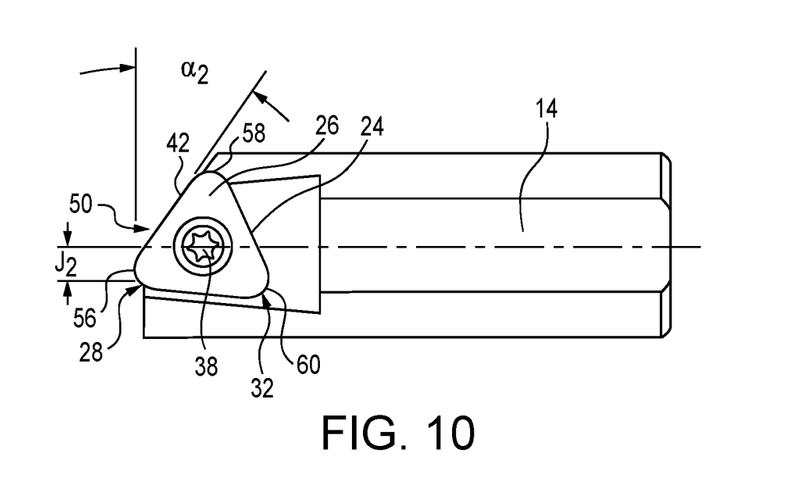
FIG. 10 is a top view of an embodiment of a second cartridge with the cutting tool insert installed for use with the machining tool of FIG. 1.
Figure 11:
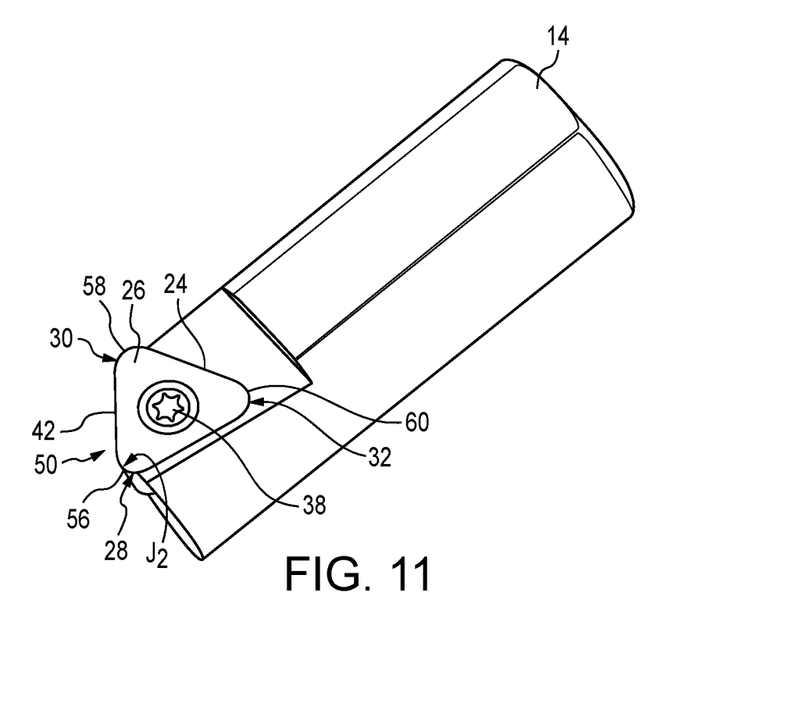
FIG. 11 is a perspective view of the second cartridge with the cutting tool insert of FIG. 10.

After completing the specified number of operations using each of the vertices 28, 30, 32 of the cutting tool insert 26 in the first cartridge 12, the cutting tool insert 26 is removed from the first cartridge 12 and inserted into and secured using fastener 38 to the second cartridge 14 for use in the machining tool 10 as illustrated in FIG. 1. As illustrated in FIGS. 10-11, the cutting tool insert 26 is positioned and secured in the second cartridge 14, with the exposed side 50 of the external surface 42 angled at α2, illustrated as approximately 35° from vertical, or approximately 20° greater than the offset of the first cartridge 12, exposing portion $J_2$ of the first vertex 28 on the cutting tool insert 26 as the exposed effective cutting surface 56. As with the first cartridge 12, the cutting tool insert 26 is used for a specified number of operations in the second cartridge 14, typically two, for each portion $J_2$ of the effective cutting surfaces 56, 58, 60 of the vertices 28, 30, 32.

While in the embodiment disclosed herein the offset is approximately 20° greater in the successive cartridges when compared to the previous cartridge, the offsets may vary by as few as 10° and as much as 25° for each of the cartridges 12, 14, 16, 18, 20.

Figure 12:
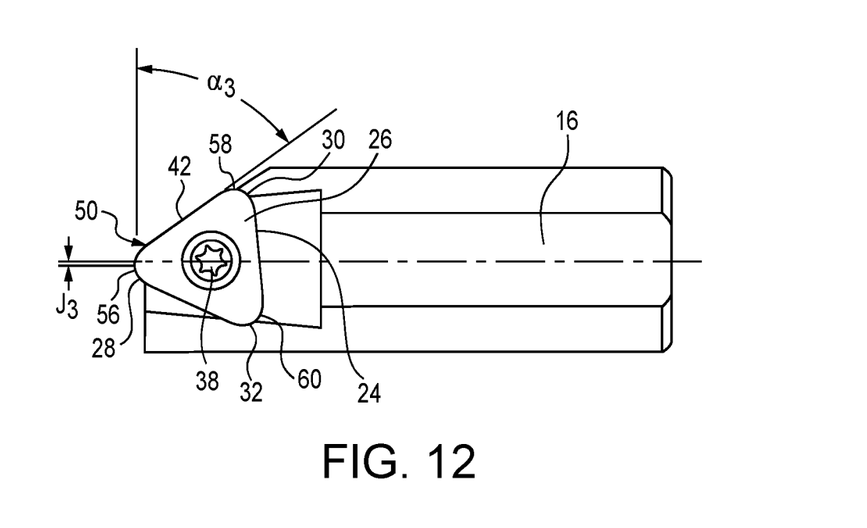
FIG. 12 is a top view of an embodiment of a third cartridge with the cutting tool insert installed for use with the machining tool of FIG. 1.
Figure 13:
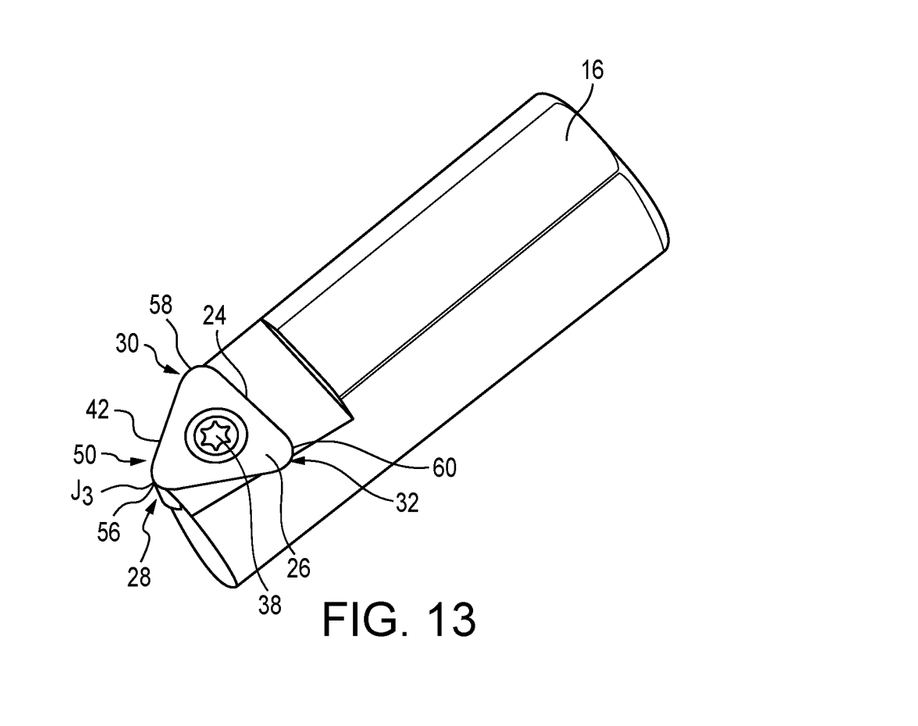
FIG. 13 is a perspective view of the third cartridge with the cutting tool insert of FIG. 12.

After completing the specified number of operations using each of the vertices 28, 30, 32 of the cutting tool insert 26 in the second cartridge 14, the cutting tool insert 26 is removed from the second cartridge 14 and inserted into and secured using fastener 38 to the third cartridge 16 for use in the machining tool 10 as illustrated in FIG. 1. As illustrated in FIGS. 12-13, the cutting tool insert 26 is positioned and secured in the third cartridge 16, with the exposed side 50 of the external surface 42 angled at $\alpha_3$, illustrated as approximately 55° from vertical, or approximately 20° greater than the offset of the second cartridge 14, exposing portion $J_3$ of the first vertex 28 of the cutting tool insert 26 as the exposed cutting surface 56. As with the first and second cartridges 12, 14, the cutting tool insert 26 is used for a specified number of operations in the third cartridge 16, typically two, for each portion $J_3$ of the effective cutting surfaces 56, 58, 60 of the vertices 28, 30, 32.

Figure 14:
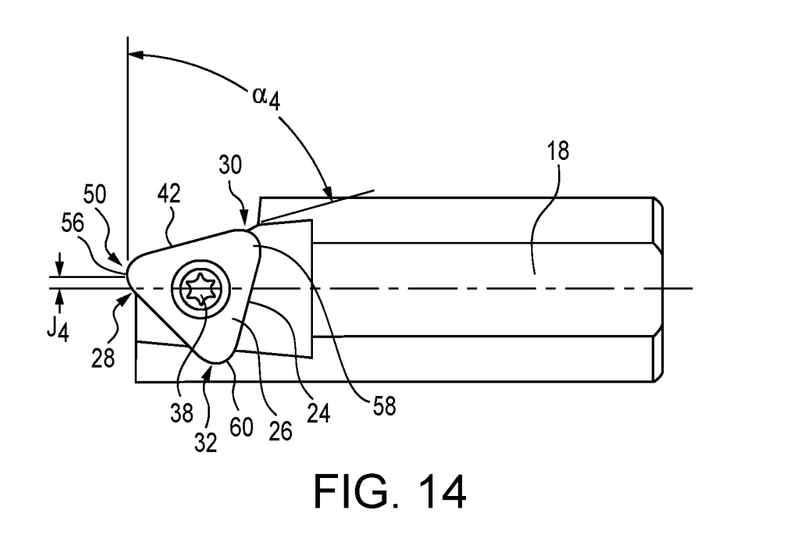
FIG. 14 is a top view of an embodiment of a fourth cartridge with the cutting tool insert installed for use with the machining tool of FIG. 1.
Figure 15:
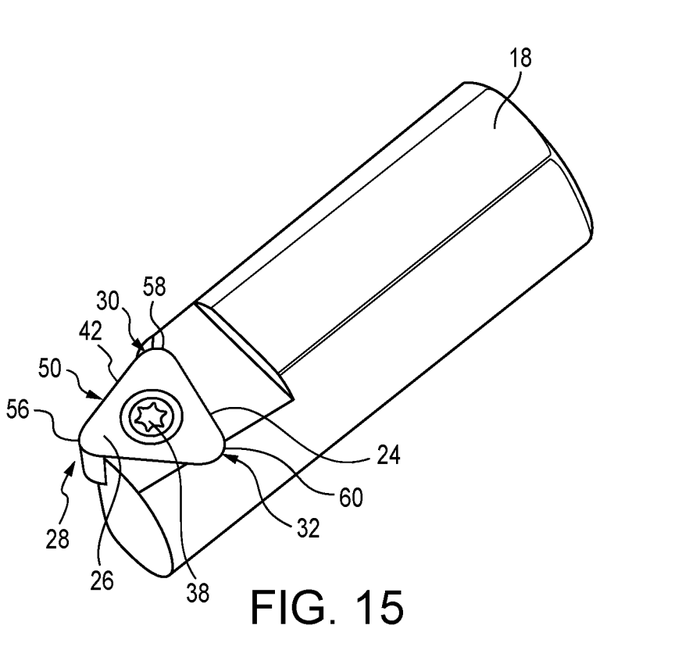
FIG. 15 is a perspective view of the fourth cartridge with the cutting tool insert of FIG. 14.

After completing the specified number of operations using each of the vertices 28, 30, 32 of the cutting tool insert 26 in the third cartridge 16, the cutting tool insert 26 is removed from the third cartridge 16 and inserted into and secured with fastener 38 to the fourth cartridge 18 for use in the machining tool 10 as illustrated in FIG. 1. As illustrated in FIGS. 14-15, the cutting tool insert 26 is positioned and secured in the fourth cartridge 14, with the exposed side 50 of the external surface 42 angled at $\alpha_4$, illustrated as approximately 75° from vertical, or approximately 20° greater than the offset of the third cartridge 16, exposing portion $J_4$ of the first vertex 28 of the cutting tool insert 26 as the exposed cutting surface 56. As with the first, second, and third cartridges 12, 14, 16, the cutting tool insert 26 is used for a specified number of operations in the fourth cartridge 18, typically two, for each portion $J_4$ of the vertices 28, 30, 32.

Figure 16:
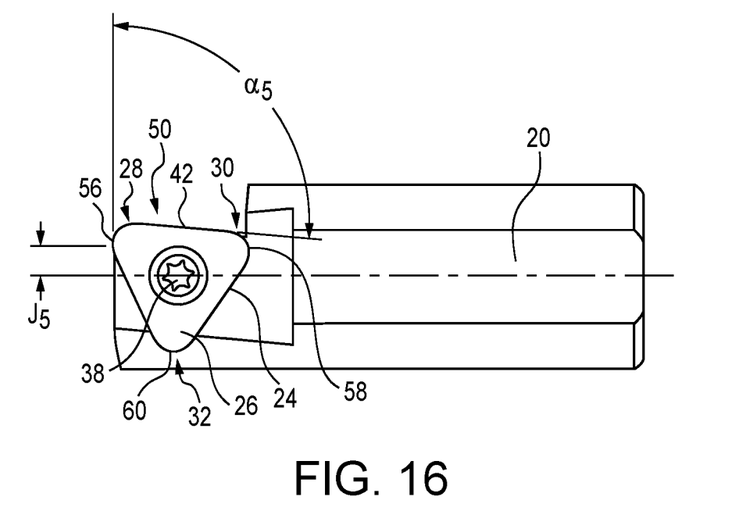
FIG. 16 is a top view of an embodiment of a fifth cartridge with the cutting tool insert installed for use with the machining tool of FIG. 1.
Figure 17:
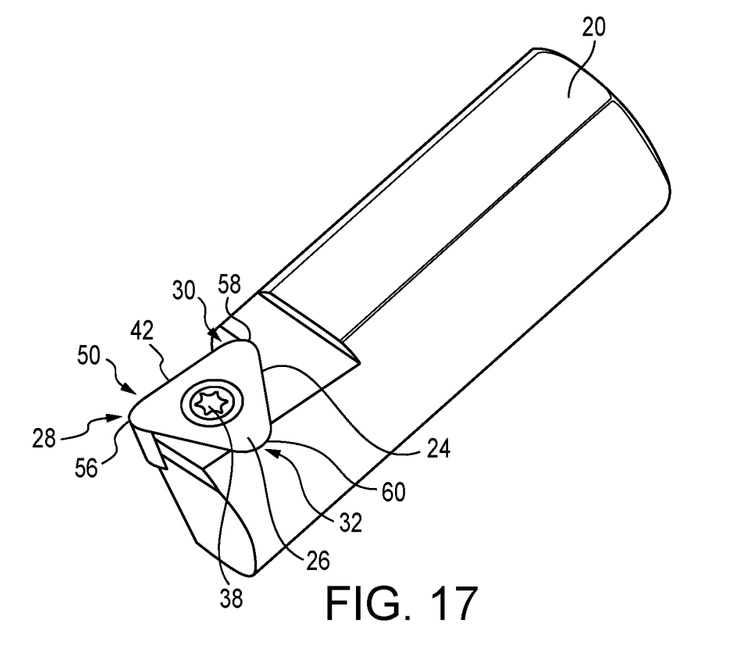
FIG. 17 is a perspective view of the fifth cartridge with the cutting tool insert of FIG. 16.

After completing the specified number of operations using each of the vertices 28, 30, 32 of the cutting tool insert 26 in the fourth cartridge 18, the cutting tool insert 26 is removed from the fourth cartridge 18 and inserted into and secured using fastener 38 to the fifth cartridge 18 for use in the machining tool 10 as illustrated in FIG. 1. As illustrated in FIGS. 16-17, the cutting tool insert 26 is positioned and secured in the fifth cartridge 20, with the exposed side 50 of the external surface 42 angled at $\alpha_5$, illustrated as approximately 95° from vertical, or approximately 20° greater than the offset of the fourth cartridge 18, exposing portion $J_5$ of the first vertex 28 of the cutting tool insert as the exposed cutting surface. As with the first cartridge 12, the cutting tool insert 26 is used for a specified number of operations in the fifth cartridge 20, typically two, for each portion $J_5$ of the vertices 28, 30, 32.

The embodiments described herein refer to a triangular-prism shaped cutting tool insert 26 insertable into five cartridges 12, 14, 16, 18, 20 with offsets $\alpha 1$, $\alpha 2$, $\alpha 3$, $\alpha 4$, and $\alpha 5$ from vertical ranging from 15° to 95°. Nothing in this application should be construed as limiting or disclaiming other shapes of cutting tool inserts 26 or the number and offsets of the cartridges. The embodiments are presented for illustration purposes.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A machining tool for cutting a work component, comprising:
    a cutting tool body;
    a cutting tool insert comprising a cutting tool insert body having a cutting surface along a portion of an external surface that defines a circumference of the cutting tool insert;
    a first cartridge insertable into and removable from the cutting tool body, the first cartridge having a first insert pocket defined therein and configured to receive the cutting tool insert, the cutting tool insert rotatable between at least first and second fixed positions in the first insert pocket, a first portion of the cutting surface exposed when the cutting tool insert is in the first fixed position, and a second portion of the cutting surface exposed when the cutting tool insert is in the second fixed position; and
    a second cartridge insertable into the cutting tool body when the first cartridge is removed and removable from the cutting tool body, the second cartridge having a second insert pocket defined therein and configured to receive the cutting tool insert, the second insert pocket being offset compared to the first insert pocket of the first cartridge, the cutting tool insert rotatable between at least first and second fixed positions in the second insert pocket, a third portion of the cutting surface exposed when the cutting tool insert is in the first fixed position of the second insert pocket, and a fourth portion of the cutting surface exposed when the cutting tool insert is in the second fixed position of the second insert pocket.

2. The machining tool of claim 1 wherein the cutting tool insert is generally triangular prism-shaped, the cutting tool insert having three arc-shaped vertices, a portion of the external surface of the cutting tool insert circumscribing each of the vertices defining the cutting surface.

3. The machining tool of claim 2 wherein the cutting surface of the cutting tool insert comprises cubic boron nitride.

4. The machining tool of claim 3 wherein the cutting tool insert body comprises tungsten carbide.

5. The machining tool of claim 4 wherein second insert pocket is offset between 10° and 25° from the first insert pocket.

6. The machining tool of claim 5 wherein the second insert pocket is offset approximately 20° from the first insert pocket.

7. The machining tool of claim 5 further comprising:
    a third cartridge insertable into the cutting tool body when the first cartridge and second cartridges are both removed and removable from the cutting tool body, the third cartridge having a third insert pocket defined therein and configured to receive the cutting tool insert, the third insert pocket being offset compared to the first insert pocket of the first cartridge and the second insert pocket of the second cartridge, the cutting tool insert rotatable between at least first and second fixed positions in the third insert pocket, a fifth portion of the cutting surface exposed when the cutting tool insert is in the first fixed position of the third insert pocket, and a sixth portion of the cutting surface exposed when the cutting tool insert is in the second fixed position of the third insert pocket.

8. The machining tool of claim 7 wherein the third insert pocket is offset between 10° and 25° from the second insert pocket.

9. The machining tool of claim 8 wherein the third insert pocket is offset approximately 20° from the second insert pocket.

10. The machining tool of claim 8 further comprising:
a fourth cartridge insertable into the cutting tool body when the first, second, and third cartridges are all removed and removable from the cutting tool body, the fourth cartridge having a fourth insert pocket defined therein and configured to receive the cutting tool insert, the third insert pocket being offset compared to the first insert pocket of the first cartridge, the second insert pocket of the second cartridge, and the third insert pocket of the third cartridge, the cutting tool insert rotatable between at least first and second fixed positions in the fourth insert pocket, a seventh portion of the cutting surface exposed when the cutting tool insert is in the first fixed position of the fourth insert pocket, and an eighth portion of the cutting surface exposed when the cutting tool insert is in the second fixed position of the fourth insert pocket.

11. The machining tool of claim 10 wherein the fourth insert pocket is offset between 10° and 25° from the third insert pocket.

12. The machining tool of claim 11 wherein the fourth insert pocket is offset approximately 20° from the third insert pocket.

13. The machining tool of claim 11 further comprising:
a fifth cartridge insertable into the cutting tool body when the first, second, third, and fourth cartridges are all removed and removable from the cutting tool body, the fifth cartridge having a fifth insert pocket defined therein and configured to receive the cutting tool insert, the fifth insert pocket being offset compared to the first insert pocket of the first cartridge, the second insert pocket of the second cartridge, the third insert pocket of the third cartridge, and the fourth insert pocket of the fourth cartridge, the cutting tool insert rotatable between at least first and second fixed positions in the fifth insert pocket, a ninth portion of the cutting surface exposed when the cutting tool insert is in the first fixed position of the fifth insert pocket, and a tenth portion of the cutting surface exposed when the cutting tool insert is in the second fixed position of the fifth insert pocket.

14. The machining tool of claim 13 wherein the fifth insert pocket is offset between 10° and 25° from the fourth insert pocket.

15. The machining tool of claim 14 wherein the fifth insert pocket is offset approximately 20° from the fourth insert pocket.

16. The machining tool of claim 14 wherein the cutting tool insert is rotatable between at least first, second, and third fixed positions in each of the first, second, third, fourth, and fifth insert pockets.

17. A machining tool for cutting a work component, comprising:
a cutting tool body;
a cutting tool insert comprising a cutting tool insert body having a cutting surface along a portion of an external surface that defines a circumference of the cutting tool insert;
a plurality of cartridges insertable into and removable from the cutting tool body, each of the plurality of cartridges having an insert pocket defined therein and configured to receive the cutting tool insert, the cutting tool insert rotatable between first, second and third fixed positions in each insert pocket of the plurality of cartridges, a first portion of the cutting surface exposed when the cutting tool insert is in the first fixed position, a second portion of the cutting surface exposed when the cutting tool insert is in the second fixed position, and a third portion of the cutting surface exposed when the cutting tool insert is in the third fixed position, the insert pocket of each of the plurality of cartridges being offset from each other.

18. The machining tool of claim 17 wherein the cutting tool insert is comprised of tungsten carbide and is generally triangular prism-shaped, the cutting tool insert having three arc-shaped vertices, a portion of the external surface of the cutting tool insert circumscribing each of the vertices defining the cutting surface, the cutting surface comprising cubic boron nitride.

19. The machining tool of claim 17 wherein each of the insert pockets of the plurality of cartridges is offset in increments of approximately 20°.

20. A method of cutting a work component with a machining tool, comprising the steps of:
inserting a cutting tool insert having a cutting surface that defines a circumference around the cutting tool insert into a first fixed position in an insert pocket formed in one of a plurality of cartridges;
inserting the one of a plurality of cartridges into a body of the machining tool;
cutting the work component;
rotating the cutting tool insert to a second fixed position in the insert pocket;
cutting the work component;
rotating the cutting tool insert to a third fixed position in the insert pocket;
cutting the work component;
removing the one of a plurality of cartridges from the body of the machining tool;
removing the cutting tool insert from the one of a plurality of cartridges; and
inserting the cutting tool insert into another one of the plurality of cartridges in which the insert pocket is offset form the insert pocket of the one of plurality of cartridges.

* * * * *